United States Patent [19]

Sylvester et al.

[11] Patent Number: 5,914,377

[45] Date of Patent: *Jun. 22, 1999

[54] METHOD FOR THE PRODUCTION OF DIENE RUBBERS IN THE GAS PHASE

[75] Inventors: Gerd Sylvester, Leverkusen; Hugo Vernaleken, Krefeld, both of Germany

[73] Assignee: Bayer AG, Leverkusen, Germany

[*] Notice: This patent is subject to a terminal disclaimer.

[21] Appl. No.: 08/813,000

[22] Filed: Mar. 4, 1997

Related U.S. Application Data

[63] Continuation-in-part of application No. 08/618,011, Mar. 25, 1996, abandoned.

[30] Foreign Application Priority Data

Apr. 4, 1995 [DE] Germany .......................... 195 12 120

[51] Int. Cl.⁶ .................. C08C 19/08; C08F 2/34
[52] U.S. Cl. ................. 526/164; 526/129; 526/136; 526/139; 526/141; 526/142; 526/153; 526/901; 525/331.9; 525/351; 525/938
[58] Field of Search ................. 525/938, 332.4, 525/351, 331.9; 526/129, 142, 151, 164, 901, 136, 139, 141, 153

[56] References Cited

U.S. PATENT DOCUMENTS

| | | | |
|---|---|---|---|
| 3,641,188 | 2/1972 | Yoo et al. | 260/683.15 |
| 3,671,462 | 6/1972 | O'Hara et al. | 252/429 |
| 3,803,053 | 4/1974 | Yoo et al. | 252/429 |
| 4,242,232 | 12/1980 | Sylvester et al. | 252/429 |
| 4,260,707 | 4/1981 | Sylvester et al. | 526/114 |
| 4,429,089 | 1/1984 | Pedretti et al. | 526/133 |
| 4,461,883 | 7/1984 | Takeuchi et al. | 526/139 |
| 4,544,718 | 10/1985 | Yeh et al. | 526/141 |
| 4,556,647 | 12/1985 | Yeh et al. | 502/102 |
| 4,575,538 | 3/1986 | Hsieh et al. | 525/244 |
| 4,619,982 | 10/1986 | Jenkins | 526/164 |
| 4,791,086 | 12/1988 | Yeh et al. | 502/102 |
| 4,801,692 | 1/1989 | Gradeff et al. | 534/15 |
| 5,017,539 | 5/1991 | Jenkins et al. | 502/102 |
| 5,021,379 | 6/1991 | Martin et al. | 502/102 |
| 5,064,910 | 11/1991 | Hattori et al. | 525/359.1 |
| 5,104,950 | 4/1992 | Martin et al. | 502/102 |
| 5,189,000 | 2/1993 | Masi et al. | 502/113 |
| 5,286,694 | 2/1994 | Pettijohn et al. | 502/110 |
| 5,391,659 | 2/1995 | Pettijohn et al. | 526/114 |
| 5,484,897 | 1/1996 | Garbassi et al. | 534/15 |

FOREIGN PATENT DOCUMENTS

| | | |
|---|---|---|
| 0 007 027 | 1/1980 | European Pat. Off. . |
| 0 011 184 | 5/1980 | European Pat. Off. . |
| 0 076 535 | 4/1983 | European Pat. Off. . |
| 0 111 391 | 6/1984 | European Pat. Off. . |
| 0 201 962 | 11/1986 | European Pat. Off. . |
| 0 375 421 | 6/1990 | European Pat. Off. . |
| 0 563 557 | 10/1993 | European Pat. Off. . |
| 0 647 657 | 4/1995 | European Pat. Off. . |
| 58-61107 | 4/1983 | Japan . |
| 59-196307 | 4/1986 | Japan . |

OTHER PUBLICATIONS

Translation of JP 58–61107 (Apr. 12, 1983).
Orbit Abstract of EP 0 007 027 (Jan. 23, 1980).
Orbit Abstract of EP 0 011 184 (May 28, 1980).
Orbit Abstract of EP 0 647 657 (Apr. 12, 1995).
Orbit Abstract of EP 0 563 557 (Oct. 6, 1993).
Abstract of SU 512 792 (May 17, 1976).
Derwent Abstract of JP59–196307 (Apr. 22, 1983).
Makromolekulare Chemie, Macromolecular Symposia, Bd. 66, Feb. 1, 1993, pp. 231–243, Lido Porri et al., *Recent Advances in the Field of Diolefin Polymerization with Transition Metal Catalysts.*
Macromolecular Symposia, Bd. 89, Jan. 1, 1995, pp. 393–409, Taube R. et al., *The Catalysis of the Stereospecific Butadiene Polymerization by Allyl Nickel and Allyl Lanthanide Complexes a Mechanistic Comparison.*
Makromol. Chem., Macromol. Symp. 66, 1993, pp. 273–288, David J. Wilson, *Recent Advances in the Neodymium Catalysed Polymerisation of 1,3–Dienes.*

*Primary Examiner*—Fred Teskin
*Attorney, Agent, or Firm*—Connolly & Hutz

[57] ABSTRACT

Diene rubbers are produced in the gas phase by first polymerizing the dienes or diene mixtures in the presence of a catalyst system, which is based on rare earth compounds, at temperatures of from 0 to 150° C. and at pressures of from 1 mbar to 50 bar, so that a pourable diene rubber having a Mooney viscosity ML (1+4', 100° C.) of 70 to 180 Mooney units is obtained, and subsequently subjecting the pourable diene rubber obtained to a chemical or thermal decomposition reaction until a Mooney viscosity of 10 to 70 Mooney units is obtained.

20 Claims, No Drawings

METHOD FOR THE PRODUCTION OF DIENE RUBBERS IN THE GAS PHASE

CROSS REFERENCE TO RELATED APPLICATION

The present application is a continuation-in-part of U.S. patent application Ser. No. 08/618,011, filed on Mar. 25, 1996, in the name of Gerd Sylvester now abandoned.

The invention relates to a method for the production of diene rubbers in the gas phase which enables the adhesiveness of the products to be so greatly lowered in the course of production that no interruptions occur in the production process owing to diminished flow properties.

Diene rubbers have for a long time been produced on a large scale and used for the manufacture of tires and other rubber goods. In this connection the polymerisation is carried out in the liquid phase using a variety of catalyst systems.

Polymerization in solution has the disadvantage that in the course of the polymerization high viscosities appear, which lead to difficulties in the transport of the solution and in the dissipation of heat. The separation of the dissolved polymers from the solvent and the removal of solvent and monomer residues from the solid polymer require a relatively high expenditure on apparatus and at the same time a high energy consumption. Furthermore, during the separation of the unreacted monomer and of the solvent from the polymer formed, low-molecular compounds can enter the environment via exhaust air and waste water and have therefore to be appropriately disposed of.

Carrying out the polymerization in the liquid monomers without addition of solvents is also known. Such a method has the disadvantage, however, that over the entire polymerization a large quantity of heat is liberated which is difficult to regulate and therefore presents a considerable potential hazard. Moreover here also pollution of the environment occurs during the separation of the polymers from the monomers.

In recent years gas phase methods for the production of the thermoplastics polyethylene and polypropylene have proved to be particularly advantageous and have gained acceptance. The advantages of the gas phase method are due in particular to the fact that no solvents or dispersants are employed and therefore a considerable reduction in costs is achieved. Furthermore high viscosities do not occur.

The advantages of the gas phase method relevant to the environment are due in particular to the fact that no solvents are employed and emissions and waste water pollution can be lessened. Gas phase methods for the production of diene rubbers have not hitherto been described. The reason that it has not hitherto been possible to use gas phase methods for the production of these articles is the particularly high adhesiveness of the diene rubbers. Owing to this the individual particles would cluster together after a short reaction time to form larger aggregates. This leads to a loss of good flow properties, a poorer dissipation of the heat of polymerization and to interruptions in the production process.

Other rubbers have not been to date produced on the large scale by gas phase methods either. Only the production of ethylene-propylene-(diene) rubbers (EP(D)M) by means of polymerization from the gas phase has been described. Problems also occur here owing to the adhesiveness of the product, albeit to a lesser degree.

Two attempts at solving this problem are known to date for EP(D)M: either the polymerization is carried out at temperatures below the softening temperature (EP 237 003) or powdering agents are used.

The use of powdering agents in order to avoid an agglomeration in granulated rubbers has been known for a long time. But the use of this method in the course of the polymerization, which is described, for example, in EP 530 709, has the disadvantage that the measured addition of the powdering agent must be carried out very precisely and that nevertheless agglutination cannot always be avoided. Moreover the powdering agents may contain substances which act as catalyst poisons and consequently interfere with the polymerisation. In the above-mentioned European Patent Application the suitability of the method described there is also specified for polybutadiene, but neither suitable catalysts nor corresponding reaction conditions are disclosed for this.

Polymerization at temperatures below the softening temperature has the disadvantage that the reaction rate is low at low temperatures and the dissipation of the heat of polymerization causes difficulties. Such methods are therefore expensive and difficult to control in practice. In the case of polybutadiene the softening temperature is so low that the monomeric diene is no longer gaseous at normal pressure. Thus, for example, the glass temperature of polybutadiene having a content of 98% cis-1,4 double bonds is below −100° C.

The object of the present invention is therefore to provide a method for the production of diene rubbers by polymerization in the gas phase, which can also be used at temperatures which permit a high polymerization rate, avoids agglutination without the addition of powdering agents and results in diene rubbers having similar properties to those which until now can be produced only by other methods, for example, by solution polymerization The object is fulfilled by the two-stage method according to the invention. The present invention therefore relates to a method for the production of diene rubbers in the gas phase, which is characterised in that in the first stage the dienes or diene mixtures, in the presence of a catalyst consisting of:

A) an alcoholate of the rare earths (I),
a carboxylate of the rare earths (II),
a complex compound of the rare earths with diketones (III) and/or an addition compound of the halides of the rare earths with an oxygen donor compound or nitrogen donor compound (IV) corresponding to the following formulae:

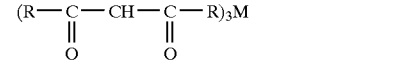

and $M_3 \cdot y$ donor (IV),

B) an aluminum trialkyl, a dialkylaluminum hydride and/or an alumoxane corresponding to the formulae (V)–(VIII):

-continued $$HAl\,R_2, \quad (VI)$$

$$R-(Al-O)_n Al\begin{matrix}R\\ \\R\end{matrix} \text{ und} \quad (VII)$$

$$\underset{R}{\underline{\overline{(AlO)_{n+1}}}}, \quad (VIII)$$

wherein in the formulae
M signifies a trivalent element from the rare earths having the atomic numbers 57 to 71,
R is identical or different and signifies alkyl radicals having 1 to 10 carbon atoms,
X represents chlorine, bromine or iodine
y signifies 1 to 6
n signifies 1 to 50,
C) a further Lewis acid and
D) an inert, particulate, inorganic solid substance having a specific surface of greater than 10 $m^2/g$ (BET) and a pore volume of from 0.3 to 15 ml/g,
with the molar ratio of component A to component B amounting to 1:1 to 1:1000, preferably 1:3 to 1:200, particularly preferably 1:3 to 1:100, the molar ratio of component A to component C amounting to 1:0.4 to 1:15, preferably 1:0.5 to 1:8 and with from 0.1 mmol to 1 mol of component A, preferably 0.5 to 50 mmol of component A, being used per 100 g of component D, are polymerised at temperatures of from 0 to 150° C., preferably of from 0 to 120° C., particularly preferably at 20 to 100° C., and at pressures of from 1 mbar to 50 bar, preferably of from 0.1 to 20 bar, with a pourable diene rubber having a Mooney viscosity ML (1+4', 100° C.) of 70 to 180 Mooney units, preferably 80 to 150 Mooney units, being obtained, and in a second stage the pourable diene rubber obtained is subjected to a chemical or thermal decomposition reaction until a Mooney viscosity ML (1+4', 100° C.) of 10 to 70 Mooney units, preferably 40 to 60 Mooney units, is obtained.

In component A, M signifies a trivalent element from the rare earths having the atomic numbers 57 to 71 in the periodic table. Preferred compounds are those wherein M signifies lanthanum, praseodymium or neodymium or a mixture of rare earth elements which contain at least one of the elements lanthanum, praseodymium or neodymium in a quantity of at least 10 wt. %. Particularly preferred are compounds wherein M signifies lanthanum or neodymium or a mixture of rare earths which contains at least 30 wt. % of lanthanum or neodymium.

Radicals which may be mentioned as radicals R in the formulae (I)–(IV) are in particular straight-chain or branched alkyl radicals having 1 to 20 carbon atoms, preferably 1 to 15 carbon atoms, such as methyl, ethyl, n-propyl, n-butyl, n-pentyl, isopropyl, isobutyl, tert.-butyl, 2-ethylhexyl, neopentyl, neooctyl, neodecyl, neododecyl. The following are given as examples of alcoholates of component A: Neodymium(III) n-propanolate, neodymium (III) n-butanolate, neodymium(III) n-decanolate, neodymium(m) isopropanolate, neodymium(III) 2-ethylhexanolate, praseodymium(III) n-propanolate, praseodymium(III) n-butanolate, praseodymium(III) n-decanolate, praseodymium(III) isopropanolate, praseodymium(M) 2-ethylhexanolate, lanthanum(III) n-propanolate, lanthanum(III) n-butanolate, lanthanum(III) n-decanolate, lanthanum(III) isopropanolate, lanthanum(III) 2-ethylhexanolate, preferably neodymium(III) n-butanolate, neodymium(III) n-decanolate, neodymium(III) 2-ethylhexanolate.

Suitable carboxylates of component A are: Lanthanum (III) propionate, lanthanum(III) diethylacetate, lanthanum (III) 2-ethylhexanoate, lanthanum(III) stearate, lanthanum (III) benzoate, lanthanum(III) cyclohexanecarboxylate, lanthanum(III) oleate, lanthanum(III) versatate, lanthanum (III) naphthenate, praseodymium(III) propionate, praseodymium(III) diethylacetate, praseodymium(III) 2-ethylhexanoate, praseodymium(III) stearate, praseodymium(III) benzoate, praseodymium(III) cyclohexanecarboxylate, praseodymium(III) oleate, praseodymium(III) versatate, praseodymium(III) naphthenate, neodymium(III) propionate, neodymium(III) diethlacetate, neodymium(III) 2-ethylhexanoate, neodymium(III) stearate, neodymium(III) benzoate, neodymium(III) cyclohexanecarboxylate, neodymium(III) oleate, neodymium(III) versatate, neodymium(III) naphthenate, preferably neodymium(III) 2-ethylhexanoate, neodymium(III) versatate, neodymium(III) naphthenate. Neodymium versatate is particularly preferred.

Complex compounds of component A which may be mentioned are: Lanthanum(III) acetylacetonate, praseodymium(III) acetylacetonate, neodymium(III) acetylacetonate, preferably neodymium(III) acetylacetonate.

The following are mentioned as examples of addition compounds of component A with donors: Lanthanum(III) chloride with tributyl phosphate, lanthanum(III) chloride with tetrahydrofuran, lanthanum(III) chloride with isopropanol, lanthanum(III) chloride with pyridine, lanthanum(III) chloride with 2-ethylhexanol, lanthanum(III) chloride with ethanol, praseodymium(III) chloride with tributyl phosphate, praseodymium(III) chloride with tetrahydrofuran, praseodymium(III) chloride with isopropanol, praseodymium(III) chloride with pyridine, praseodymium(III) chloride with 2-ethylhexanol, praseodymium(III) chloride with ethanol, neodymium(III) chloride with tributyl phosphate, neodymium(III) chloride with tetrahydrofuran, neodymium(III) chloride with isopropanol, neodymium(III) chloride with pyridine, neodymium(III) chloride with 2-ethylhexanol, neodymium (III) chloride with ethanol, lanthanum(III) bromide with tributyl phosphate, lanthanum(III) bromide with tetrahydrofuran, lanthanum(III) bromide with isopropanol, lanthanum(III) bromide with pyridine, lanthanum(III) bromide with 2-ethylhexanol, lanthanum(III) bromide with ethanol, praseodymium(III) bromide with tributyl phosphate, praseodymium(III) bromide with tetrahydrofuran, praseodymium(III) bromide with isopropanol, praseodymium(III) bromide with pyridine, praseodymium(III) bromide with 2-ethylhexanol, praseodymium(III) bromide with ethanol, neodymium(III) bromide with tributyl phosphate, neodymium(III) bromide with tetrahydrofuran, neodymium(III) bromide with isopropanol, neodymium(III) bromide with pyridine, neodymium(III) bromide with 2-ethylhexanol, neodymium (III) bromide with ethanol, preferably lanthanum(III) chloride with tributyl phosphate, lanthanum(III) chloride with pyridine, lanthanum(III) chloride with 2-ethylhexanol, praseodymium(III) chloride with tributyl phosphate, praseodymium(III) chloride with 2-ethylhexanol, neodymium(III) chloride with tributyl phosphate, neodymium(III) chloride with tetrahydrofuran, neodymium (III) chloride with 2-ethylhexanol, neodymium(III) chloride with pyridine, neodymium(III) chloride with 2-ethylhexanol, neodymium(III) chloride with ethanol.

The compounds of the rare earths may be used separately or mixed with one another.

Particularly preferably neodymium versatate, neodymium octanoate and/or neodymium naphthenate are used as component A.

In the formulae (V) to (VII) of component B, R signifies a straight-chain or branched alkyl radical having 1 to 10 C atoms, preferably 1 to 4 C atoms. Examples of suitable aluminium alkyls corresponding to the formulae (V) and (VI) are:

Trimethylaluminium, triethylaluminium, tri-n-propylaluminium, triisopropylaluminium, tri-n-butylaluminium, triisobutylaluminium, tripentylaluminium, trihexylaluminium, tricyclohexylaluminium, trioctylaluminium, diethylaluminium hydride, di-n-butylaluminium hydride and diisobutylaluminium hydride. Triethylaluminium, triisobutylaluminium and diisobutylaluminium hydride are preferred.

The following are given as examples of alumoxanes (VII) and (VIII): Methylalumoxane, ethylalumoxane and isobutylalumoxane, preferably methylalumoxane and isobutylalumoxane.

The aluminium alkyls may be used separately or mixed with one another.

So-called Lewis acids are used as component C. Examples which may be mentioned are the organometal halides wherein the metal atom belongs to the group 3a) or 4a), as well as halides of elements of the groups 3a), 4a) and 5a) of the periodic table, as described in "Handbook of Chemistry and Physics", 45th Edition, 1964–65. The following are mentioned in particular:

Methylaluminium dibromide, methylaluminium dichloride, ethylaluminium dibromide, ethylaluminium dichloride, butylaluminium dibromide, butylaluminium dichloride, dimethylaluminium bromide, dimethylaluminium chloride, diethylaluminium bromide, diethylaluminium chloride, dibutylaluminium bromide, dibutylaluminium chloride, methylaluminium sesquibromide, methylaluminium sesquichloride, ethylaluminium sesquibromide, ethylaluminium sesquichloride, aluminium tribromide, antimony trichloride, antimony pentachloride, phosphorus trichloride, phosphorus pentachloride, tin tetrachloride.

The compounds preferably used are diethylaluminium chloride, ethylaluminium sesquichloride, ethylaluminium dichloride, diethylaluminium bromide, ethylaluminium sesquibromide and/or ethylaluminium dibromide.

The reaction products of aluminium compounds described as component B with halogens or halogen compounds, for example, triethylaluminium with bromine or triethylaluminium with butyl chloride, may also be used as component C. In this case the reaction can be conducted separately, or the quantity of the alkyl aluminium compound required for the reaction is added to the quantity required as component B.

Ethylaluminium sesquichloride, butyl chloride and butyl bromide are preferred.

When the alumoxanes (VII) and (VIII) are used as component B, component C can be wholly or partly dispensed with.

Inert, particulate, inorganic solid substances having a specific surface greater than 10 m$^2$/g, preferably of from 10 to 1,000 m$^2$/g (BET) and a pore volume of from 0.3 to 15 ml/g, preferably of from 0.5 to 12 ml/g, are used as component D. The specific surface (BET) is determined in conventional manner in accordance with S. Brunauer, P. H. Emmett and Teller, J. Amer. Chem. Soc. 60 (2), 309 (1938). The pore volume is determined by the centrifugation method according to M. McDaniel, J. Colloid Interface Sci. 78, 31 (1980).

Suitable inert, inorganic solid substances are in particular silica gels, clays, aluminosilicates, talc, zeolites, carbon black, inorganic oxides such as silicon dioxide, aluminium oxide, magnesium oxide, titanium dioxide, silicon carbide, preferably silica gels, aluminium oxide, zeolites and carbon black, particularly preferably silica gel. In this case the term inert means that the solid substances neither have a reactive surface nor contain adsorbed material, which hinder the formation of an active catalyst and react with the monomers respectively.

The said inert inorganic solid substances which meet the above specification and are therefore suitable for use are described in more detail, for example, in Ullmanns Enzyclopädie der technischen Chemie, Volume 21, page 439 ff. (silica gels), Volume 23, page 311 ff. (clays), Volume 14, page 633 ff. (carbon blacks), Volume 24, page 575 ff. and Volume 17, page 9 ff. (zeolites).

The inorganic solid substances may be used separately or mixed with one another.

It is also possible to add yet a further component E to the catalyst components A to D. The said component E is a conjugated diene, which can be the same diene as that which is to be subsequently polymerised by the catalyst. Preferably butadiene and isoprene are used.

If component E is added to the catalyst, the quantity of E is preferably 0.1 to 1,000 mol, referred to 1 mol of component A, particularly preferably 0.1 to 100 mol, referred to 1 mol of component A. Most preferably 0.5 to 50 mol of E, referred to 1 mol of component A, is used.

The dienes which can be used in particular in the method according to the invention are butadiene-1,3, isoprene, pentadiene-1,3, hexadiene-1,3, 2,3-dimethylbutadiene-1,3 and octadiene-1,3, preferably butadiene-1,3, isoprene and pentadiene-1,3, particularly preferably butadiene-1,3.

According to the invention the polymerization of the dienes or diene mixtures is carried out by bringing the gaseous diene into contact with the catalyst. Additional inert gases can be admixed to the gaseous diene, such as nitrogen or butane, which serve either as diluents or for the dissipation of heat.

Good control of the polymerization temperature is necessary in order to achieve the above-mentioned high Mooney viscosities in the diene rubbers. The measured temperature is in many cases not identical with the maximum temperature which occurs in the different particles. The maximum temperature should not exceed 150° C. For this reason the polymerization is carried out at temperatures of from 0 to 150° C., preferably of from 0 to 120° C., particularly preferably of from 20 to 100° C.

In order to ensure a good temperature control during the diene polymerization, it is frequently useful to adjust the rate of diene addition so as to avoid too high a temperature in the reaction mixture. By way of example, the diene addition is measured so that, even with an increase in the conversion per unit of time of 20% as compared with the original value, the cooling capacity is sufficient to prevent an elevation in temperature, referred to the originally adjusted temperature.

The method according to the invention can be carried out in any apparatus suitable for a gas phase polymerization. Thus, for example, a stirred-tank reactor, a revolving reactor or a fluidized bed reactor or a combination of these reactor types can be used. The method according to the invention is so devised that the polymerization of the dienes used results in a pourable polydiene rubber having a Mooney viscosity (ML (1+4', 100° C.)) of 70 to 180 Mooney units, preferably 80 to 150 Mooney units.

In one feasible embodiment, the procedure for the polymerization in the first stage of the method is as follows:

The catalyst is transferred to an apparatus which is suitable for maintaining the pulverulent catalyst in motion. This can be effected, for example, by stirring, rotation and/or by means of a gas stream. The inert gas initially present in the gaseous space, for example, nitrogen, is replaced by the gaseous monomer (diene). In the course of this an instant polymerization begins and the temperature rises. The monomer, optionally diluted by an inert gas, is fed to the reactor only so rapidly that the desired maximum reaction temperature is not exceeded. The reaction temperature can also be adjusted by heating or cooling in the conventional manner. The polymerization is terminated by cutting off the supply of monomer. The catalyst can be deactivated after the first stage of the method or be maintained in its active form.

The pourable diene rubber resulting during the first stage according to the invention in a second stage is subjected to a chemical or thermal decomposition reaction, with a polydiene having a Mooney viscosity in the range of 10 to 70 Mooney units, preferably 40 to 60 Mooney units, being obtained.

The decrease in the Mooney viscosity in the second reaction stage of the method according to the invention can be achieved by subjecting the diene rubbers obtained in the first stage to an appropriate shearing action with the addition of so-called masticators, for example, pentachlorothiophenol or dibenzoaminodiphenyl sulphide, optionally in combination with a booster, in a suitable high-viscosity unit, for example, a kneader, a roll mill or a screw mixer. Masticators and their use for lowering the molecular weight of rubbers are known and are described, for example, in Kirk-Othmer, Encyclopedia of Chemical Technology, Third Edition 1982, Volume 20, pages 436 to 437 or in Ullmann's Encyclopedia of Industrial Chemistry, Fifth Edition 1993, pages 404 to 405.

The conditions under which the second stage of the method according to the invention is carried out depend on the type of high-viscosity unit employed, on the Mooney viscosity of the diene rubber after the first stage of the method and on the intended Mooney viscosity of the end product.

The temperature can be varied within a wide range. Generally the temperature is from 25 to 190° C., preferably between 80 and 180° C.

The masticator is used in a quantity of from 0.01 to 10 phr, preferably from 0.05 to 5 and particularly preferably from 0.1 to 3 phr.

The invention is illustrated by the following Example.

EXAMPLES

Example 1 a) Pretreatment of the support

Vulkasil S was used as the support. Vulkasil is a silica gel from Bayer AG having a BET surface area of 230 m$^2$/g. The pore volume is 2.95 ml/g. Prior to being used the Vulkasil S was dried at 250° C. for 24 hours and then 100 g of Vulkasil S was stirred for 20 minutes together with a solution of 50 mmol of diisobutylaluminium hydride (DIBAH) in 500 ml of hexane. Subsequently the hexane was drawn off under vacuum and the residue was dried in a vacuum at 25° C.

b) Preparation of the catalyst

A catalyst was prepared by mixing together 120 ml of dry n-hexane, 150 mmol of DIBAH and 3.0 mmol of ethylaluminium sesquichloride (EASC) in a 1 l flask equipped with a nitrogen inlet and a magnetic stirrer. After 0.15 g of butadiene had been introduced into the solution, 3.0 mmol of neodymium versatate (NDV) was added. The resulting mixture was added to a suspension of 100 g of the support described in a) in 200 ml of n-hexane. After 5 minutes the batch was evaporated to dryness in a vacuum. 106 g of a free-flowing powder was isolated.

c) Polymerization

The polymerization was carried out in a rotary evaporator equipped with a magnetic stirring rod, a mercury pressure relief valve and connections to a vacuum pump and, for the supply of gaseous nitrogen and butadiene, a thermosensor extending almost to the base of the 1 l flask. The inclination of the rotary evaporator was adjusted so that the axis of rotation formed an angle of 45° with the magnetic rod. The overall volume of the apparatus was 1.5 liters. 21.2 g of the catalyst was placed in the flask under nitrogen. The apparatus was evacuated to 1 mbar and, accompanied by stirring and rotation, filled with gaseous, dry butadiene and maintained at a pressure of between 950 and 1000 mbar. The apparatus was cooled by a fan. Within 50 minutes the temperature rose to 96° C. After 50 minutes 97 g of butadiene had been consumed and the temperature was 80° C. The cooling fan was switched off.

Throughout the entire reaction time the polybutadiene formed was in a pourable, granular form. No baking onto the reactor wall occurred.

After 16.5 hours the supply of butadiene was cut off, the apparatus was evacuated and filled with nitrogen, and the coarse-grained product formed was removed from the flask. The weight was 374 g. The product was shortstopped and stabilised on the roll using 4 g of stearic acid and 2 g of Vulkanox BKF from Bayer AG.

The Mooney viscosity of the polymer ML (1+4', 100° C.) was 154 Mooney units.

d) Decomposition 55 g of the polymer thus prepared was placed in a kneader (Haake "Rheocord System 90") preheated to 120° C. and, after compaction with 1.5 g of Renacit 11, a masticator containing as active substance 40 wt. % of 2,2'-dibenzamido-diphenyl sulphide, was kneaded at 50 rev/min. After the maximum turning moment of 28 Nm at 133° C. had been attained, the turning moment decreased within 20 minutes to 11 nm at 121° C. Following storage for 24 hours, a Mooney viscosity ML (1+4', 100° C.) of 17 Mooney units was determined for the polymer.

What is claimed is:

1. Method for the production of diene rubbers comprising: a first stage wherein gaseous dienes or diene mixtures are polymerized by contacting said gaseous dienes or diene mixtures with a catalyst consisting of:

A) an alcoholate of the rare earths (I),
a carboxylate of the rare earths (II),
a complex compound of the rare earths with diketones (III) and/or an addition compound of the halides of the rare earths with an oxygen donor compound or nitrogen donor compound (IV) corresponding to the following formulae:

$$(RO)_3M, \quad (I)$$

$$(R\!-\!CO_2)_3M, \quad (II)$$

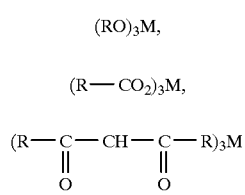
$$(III)$$

and $MX_3 \cdot y$ donor (IV),

B) at least one compound selected from the group consisting of an aluminium trialkyl, a dialkylaluminium hydride and an alumoxane corresponding to formulae (V)–(VIII):

$$Al\ R_3, \quad (V)$$

$$HAl\ R_2, \quad (VI)$$

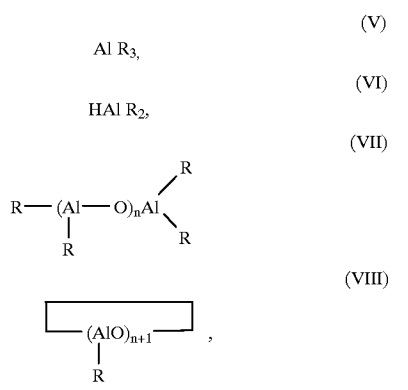

wherein in the formulae

M signifies a trivalent element from the rare earths having the atomic numbers 57 to 71, R is identical or different and signifies alkyl radicals having 1 to 10 carbon atoms, X represents chlorine, bromine or iodine, y signifies 1 to 6, n signifies 1 to 50, C) a Lewis acid and D) an inert, particulate, inorganic solid substance having a specific surface of greater than 10 m²/g (BET) and a pore volume of from 0.3 to 15 ml/g, with the molar ratio of component A to component B amounting to 1:1 to 1:1000, the molar ratio of component A to component C amounting to 1:0.4 to 1:15 and with from 0.1 mmol to 1 mol of component A being used per 100 g of component D, at temperatures of from 0 to 150° C. and at pressures of from 1 mbar to 50 bar, with a pourable diene rubber having a Mooney viscosity ML (1+4', 100° C.) of 70 to 180 Mooney units being obtained, and a second stage wherein the pourable diene rubber is subjected to a chemical or thermal decomposition reaction until a Mooney viscosity ML (1+4', 100° C.) of 10 to 70 Mooney units is obtained.

2. Method for the production of diene rubbers comprising: a first stage wherein gaseous dienes or diene mixtures are polymerized by contacting said gaseous dienes or diene mixtures with a catalyst consisting of:

A) an alcoholate of the rare earths (I), a carboxylate of the rare earths (II), a complex compound of the rare earths with diketones (III) and/or an addition compound of the halides of the rare earths with an oxygen donor compound or nitrogen donor compound (IV) corresponding to the following formulae:

$$(RO)_3M, \quad (I)$$

$$(R\!-\!CO_2)_3M, \quad (II)$$

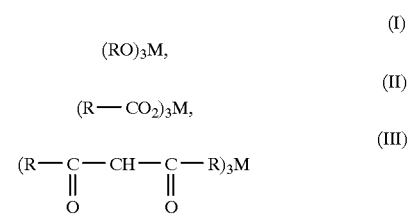
$$(III)$$

and $MX_3 \cdot y$ donor (IV),

B) at least one compound selected from the group consisting of an aluminium trialkyl, a dialkylaluminium hydride and an alumoxane corresponding to formulae (V)–(VIII):

$$Al\ R_3, \quad (V)$$

$$HAl\ R_2, \quad (VI)$$

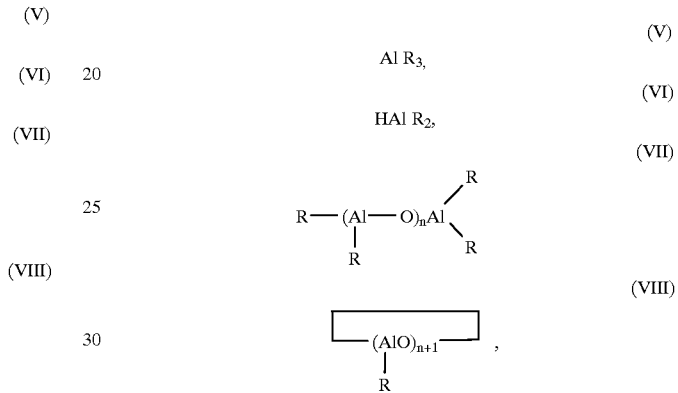

wherein in the formulae

M signifies a trivalent element from the rare earths having the atomic numbers 57 to 71, R is identical or different and signifies alkyl radicals having 1 to 10 carbon atoms, X represents chlorine, bromine or iodine, y signifies 1 to 6, n signifies 1 to 50, C) a compound which is different from the compound in B) and which is a Lewis acid; and D) an inert, particulate, inorganic solid substance having a specific surface of greater than 10 m²/g (BET) and a pore volume of from 0.3 to 15 ml/g, with the molar ratio of component A to component B amounting to 1:1 to 1:1000, the molar ratio of component A to component C amounting to 1:0.4 to 1:15 and with from 0.1 mmol to 1 mol of component A being used per 100 g of component D, at temperatures of from 0 to 150° C. and at pressures of from 1 mbar to 50 bar, with a pourable diene rubber having a Mooney viscosity ML (1+4', 100° C.) of 70 to 180 Mooney units being obtained, and a second stage wherein the pourable diene rubber is subjected to a chemical or thermal decomposition reaction until a Mooney viscosity ML (1+4', 100° C.) of 10 to 70 Mooney units is obtained.

3. Method for the production of diene rubbers comprising: a first stage wherein gaseous dienes or diene mixtures are polymerized by contacting said gaseous dienes or diene mixtures with a catalyst consisting of:

A) an alcoholate of the rare earths (I), a carboxylate of the rare earths (II), a complex compound of the rare earths with diketones (III) and/or an addition compound of the halides of the rare earths with an oxygen donor compound or nitrogen donor compound (IV) corresponding to the following formulae:

$$(RO)_3M, \quad (I)$$

$$(R-CO_2)_3M, \quad (II)$$

$$(R-\underset{\underset{O}{\|}}{C}-CH-\underset{\underset{O}{\|}}{C}-R)_3M \quad (III)$$

and $MX_3 \cdot y$ donor (IV),

B) at least one compound selected from the group consisting of a compound of formula (VII) and a compound of formula (VIII):

$$R-(Al-O)_nAl\underset{R}{\overset{R}{\diagup}} \quad (VII)$$

$$\underset{R}{\overset{\boxed{\phantom{XXX}}}{|}}(AlO)_{n+1}\underset{}{\overset{\boxed{\phantom{XXX}}}{}}, \quad (VIII)$$

wherein in the formulae R

M signifies a trivalent element from the rare earths having the atomic numbers 57 to 71, R is identical or different and signifies alkyl radicals having 1 to 10 carbon atoms, X represents chlorine, bromine or iodine, y signifies 1 to 6, n signifies 1 to 50, D) an inert, particulate, inorganic solid substance having a specific surface of greater than 10 m²/g (BET) and a pore volume of from 0.3 to 15 ml/g, with the molar ratio of component A to component B amounting to 1:1 to 1:1000 and with from 0.1 mmol to 1 mol of component A being used per 100 g of component D, at temperatures of from 0 to 150° C. and at pressures of from 1 mbar to 50 bar, with a pourable diene rubber having a Mooney viscosity ML (1+4', 100° C.) of 70 to 180 Mooney units being obtained, and a second stage wherein the pourable diene rubber is subjected to a chemical or thermal decomposition reaction until a Mooney viscosity ML (1+4', 100° C.) of 10 to 70 Mooney units is obtained.

4. Method for the production of diene rubbers according to claim 2, wherein in addition to components A)–D), said catalyst further consists of a component E) which is a conjugated diene, further wherein the molar ratio of component A to component E amounts to 1:0.1 to 1:1000.

5. The method of claim 1, wherein the molar ratio of component A to component B is 1:3 to 1:200.

6. The method of claim 1, wherein the molar ratio of component A to component C is 1:0.5 to 1:8.

7. The method of claim 1, wherein from 0.5 to 50 mmol of component A are used per 100 g of component D.

8. The method of claim 1, wherein the polymerization temperature is from 0 to 120° C.

9. The method of claim 1, wherein the polymerization pressure is from 0.1 to 20 bar.

10. The method of claim 1, wherein the Mooney viscosity of the pourable diene rubber obtained in the first stage is from 80 to 150 Mooney units.

11. The method of claim 4, wherein component E) is selected from the group consisting of butadiene and isoprene.

12. The method of claim 1, wherein M signifies lanthanum, praseodymium or neodymium.

13. The method of claim 1, wherein R is an alkyl radical selected from the group consisting of methyl, ethyl, n-propyl, n-butyl, n-pentyl, isopropyl, isobutyl, tert.-butyl, 2-ethylhexyl, neopentyl, neooctyl and neodecyl.

14. The method of claim 1, wherein the alcoholate of the rare earths (I) is selected from the group consisting of neodymium (III) n-butanolate, neodymium (III), n-decanolate and neodymium (III) 2-ethylhexanolate.

15. The method of claim 1, wherein the carboxylate of the rare earths (II) is selected from the group consisting of neodymium (III) 2-ethylhexanoate, neodymium (III) versatate and neodymium (III) naphthenate.

16. The method of claim 1, wherein the complex compound of the rare earths with diketones (III) is selected from the group consisting of lanthanum (III) acetylacetonate, praseodymium (III) acetylacetonate and neodymium (III) acetylacetonate.

17. The method of claim 1, wherein the addition compound of the halides of the rare earths with an oxygen donor compound or nitrogen donor compound (IV) is selected from the group consisting of lanthanum (III) chloride with tributyl phosphate, lanthanum (III) chloride with pyridine, lanthanum (III) chloride with 2-ethylhexanol, praseodymium (III) chloride with tributyl phosphate, praseodymium (III) chloride with 2-ethylhexanol, neodymium (III) chloride with tributyl phosphate, neodymium (III) chloride with tetrahydrofuran, neodymium (III) chloride with 2-ethylhexanol, neodymium (III) chloride with pyridine, neodymium (III) chloride with pyridine, neodymium (III) chloride with 2-ethylhexanol and neodymium (III) chloride with ethanol.

18. The method of claim 1, wherein component A is at least one compound selected from the group consisting of neodymium versatate, neodymium octanoate and neodymium naphthenate.

19. The method of claim 1, wherein component B is at least one compound selected from the group consisting of triethylaluminium, triisobutylaluminium, dilsobutylaluminium hydride, methylalumoxane, ethylalumoxane and isobutylalumoxane.

20. The method of claim 1, wherein component C) is selected from the group consisting of diethylaluminium chloride, ethylaluminium sesquichloride, ethylaluminium dichloride, diethylaluminium bromide, ethylaluminium sesquibromide and ethylaluminium dibromide.

* * * * *

UNITED STATES PATENT AND TRADEMARK OFFICE
CERTIFICATE OF CORRECTION

PATENT NO. : 5,914,377
DATED : June 22, 1999
INVENTOR(S) : Sylvester, et al.

It is certified that error appears in the above-identified patent and that said Letters Patent is hereby corrected as shown below:

On the cover page, in section [56], Reference Cited, FOREIGN PATENT DOCUMENTS,
"59-196307    4/1986    Japan"
should read,
-- 59-196307    4/1983    Japan--.

In column 11, line 31 (claim 3), "R" should be deleted.
In column 12, line 52 (claim 19) "diIsobutylaluminium" should be --diisobutylaluminium--.

Signed and Sealed this

Tenth Day of October, 2000

*Attest:*

Q. TODD DICKINSON

*Attesting Officer*    *Director of Patents and Trademarks*